(12) United States Patent
Hergenhan et al.

(10) Patent No.: US 7,122,814 B2
(45) Date of Patent: Oct. 17, 2006

(54) ARRANGEMENT FOR THE STABILIZATION OF THE RADIATION EMISSION OF A PLASMA

(75) Inventors: Guido Hergenhan, Jena (DE); Christian Ziener, Jena (DE); Kai Gaebel, Jena (DE)

(73) Assignee: XTREME technologies GmbH, Jena (DE)

( * ) Notice: Subject to any disclaimer, the term of this patent is extended or adjusted under 35 U.S.C. 154(b) by 320 days.

(21) Appl. No.: 10/788,609

(22) Filed: Feb. 27, 2004

(65) Prior Publication Data
US 2004/0195529 A1    Oct. 7, 2004

(30) Foreign Application Priority Data
Mar. 28, 2003  (DE) ................ 103 14 849

(51) Int. Cl.
*G01N 21/73*  (2006.01)
*G01L 21/30*  (2006.01)
(52) U.S. Cl. ............................. 250/504 R; 372/57
(58) Field of Classification Search ............ 250/504 R; 372/57; 315/111.71; 156/345.38; 378/119; 359/625; 356/318
See application file for complete search history.

(56) References Cited
U.S. PATENT DOCUMENTS 6,498,685 B1 * 12/2002 Johnson .................. 359/626
6,882,704 B1 *  4/2005 Schriever et al. ........ 378/119
2004/0105095 A1 *  6/2004 Stobrawa et al. ........ 356/318
2005/0274912 A1 * 12/2005 Hergenhan et al. ...... 250/504 R

FOREIGN PATENT DOCUMENTS

| EP | 0 186 491 | 6/1992 |
|---|---|---|
| EP | 0 895 706 | 2/1999 |
| WO | WO 97/40650 | 10/1997 |
| WO | WO 01/30122 | 4/2001 |
| WO | WO 01/49086 | 7/2001 |
| WO | WO 02/32197 | 4/2002 |

OTHER PUBLICATIONS

Review of Scientific Instruments, Feb. 2003, vol. 72, No. 2, pp. 969-974, Article: "Spatial characterizaion of extreme ultraviolet plasma generated by laser excitation of xenon gas targets" Sebastian Kranzusch, et al.

* cited by examiner

*Primary Examiner*—Otilia Gabor
(74) *Attorney, Agent, or Firm*—Reed Smith LLP

(57) ABSTRACT

A short-wavelength radiation is generated which is stable over time from a plasma generated by energy input into a target jet, in which intensity variations due to altered coupling of excitation radiation into the target jet are minimized. Measuring devices are provided for successive detection over time of deviations of at least one of the directions of the target jet or the energy beam from an intersection point of the two directions that is provided as an interaction point. The measuring devices have output signals which are suitable as regulating variables for the orientation of the directions on the interaction point, and actuating elements are provided for adjusting and tracking at least one of the directions of either the target jet or the energy beam depending on the output signal of the measuring devices in the manner of a control loop.

27 Claims, 6 Drawing Sheets

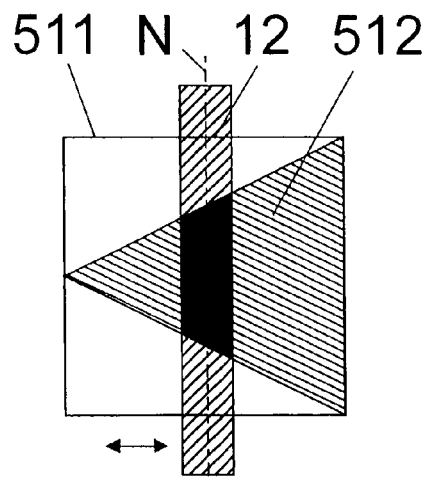
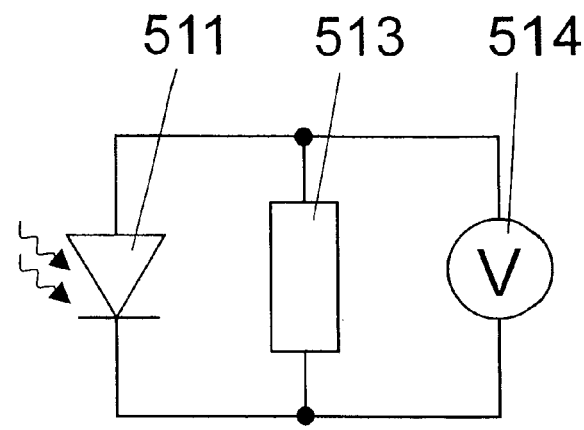
Fig. 5a  Fig. 5b
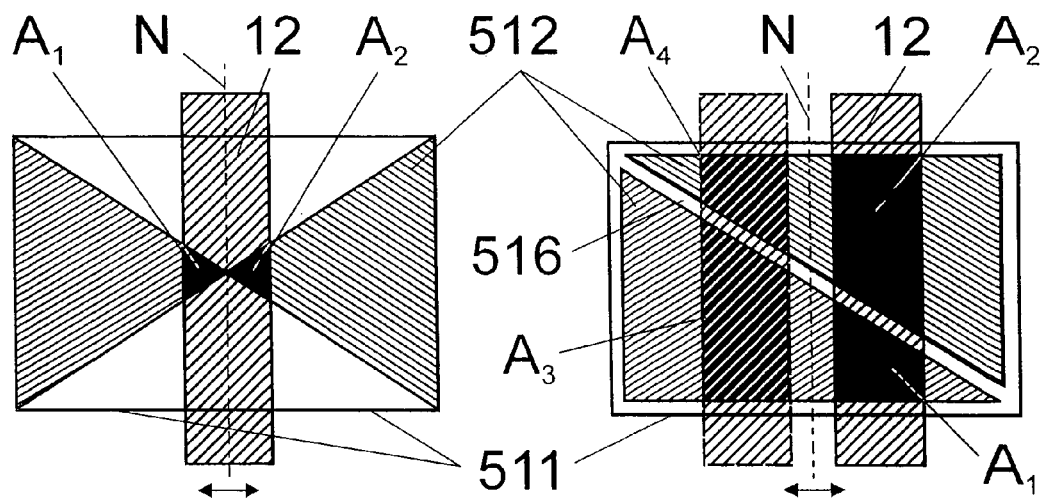
Fig. 6a  Fig. 6b
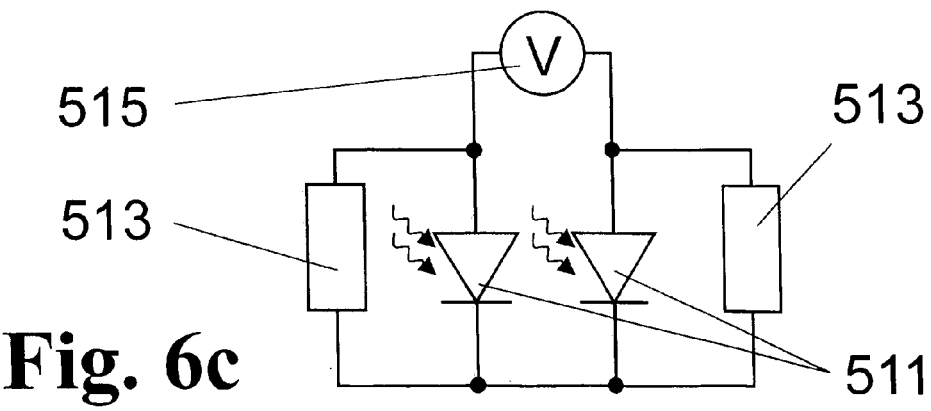
Fig. 6c

ARRANGEMENT FOR THE STABILIZATION OF THE RADIATION EMISSION OF A PLASMA

CROSS-REFERENCE TO RELATED APPLICATION

This application contains priority of German Application No. 103 14 849.3, filed Mar. 28, 2003, the complete disclosure of which is hereby incorporated by reference.

BACKGROUND OF THE INVENTION a) Field of the Invention

The invention is directed to an arrangement for stabilizing the radiation emission of a plasma, particularly for generating extreme ultraviolet radiation (EUV radiation), in which a bundled energy beam is directed to a target, wherein the target is formed as a target jet and has a flow direction oriented substantially orthogonal to the radiating direction of the energy beam.

b) Description of the Related Art

A laser-produced plasma (LPP) is usually used to generate EUV radiation. For this purpose, a target, as it is called, is irradiated by a laser and in this way is heated to the extent that characteristic and temperature radiation with a significant proportion in the extreme ultraviolet (EUV) spectral region is emitted. In practice, the target is struck by the laser beam differently over the course of time resulting in fluctuations in the intensity of the EUV radiation over time. However for many applications, especially as a radiation source for semiconductor lithography, the emitted radiation output in the EUV spectral region may only be subject to very slight fluctuations.

Some prior art solutions use a target in the form of a target beam which ensures a continuous material flow with the highest possible density and low divergence. A target beam of this type typically has a diameter between 0.01 mm and 0.1 mm. A laser beam directed to the target beam must be focused in order to generate the plasma. Vibrations or other variations in the two (relatively) independent generation systems typically lead to directional instabilities of the target beam and laser beam and, accordingly, to an absorption efficiency of the laser energy into the target material that varies over time and, therefore, to an irregular emission of the EUV radiation.

Devices and methods for EUV generation by means of laser irradiation of different targets are described in numerous patents and laid-open applications. Many of these targets, particularly the mass-limited targets, have in common that they have small dimensions in the sub-millimeter range in two dimensions, e.g., H. Hertz WO 97/40650/EP 0895706 (jet target), M. Schmidt WO 01/30122 A1 (droplet mist), or even in three dimensions, e.g., E. Noda EP 0186491 B1 (droplet). The constancy of the absorption efficiency of the laser radiation into the target over time is not monitored or ensured in any of the references cited above.

OBJECT AND SUMMARY OF THE INVENTION

It is the primary object of the invention to find a novel possibility for generating short-wave radiation, particularly EUV radiation, which is stable over time from a plasma generated by energy input into a target beam, in which intensity variations due to altered coupling of excitation radiation into the target beam are minimized.

In an arrangement for the stabilization of the radiation emission of a plasma, particularly for generating extreme ultraviolet (EUV) radiation, in which a bundled energy beam is directed to a target which is formed as a target jet and which has a flow direction oriented substantially orthogonal to the direction of the energy beam, the above-stated object is met, according to the invention, in that measuring devices are provided for successive detection over time of deviations of at least one of the directions of the target jet and energy beam from an intersection point of the two directions that is provided as an interaction point, wherein the measuring devices have output signals which are suitable as regulating variables for the orientation of the directions on the interaction point and actuating elements are provided for adjusting and tracking at least one of the directions of the target beam and energy beam depending on the output signal of the measuring devices in the manner of a control loop.

Measuring devices are advantageously provided for detecting deviations of the radiating directions at the interaction point in a linear dimension which is oriented orthogonal to the directions of target jet and energy beam. The measuring devices are arranged substantially in the direction of the axis of the energy beam.

A measuring device is advisably provided in said dimension for acquiring the position of the target jet. A spatially resolving sensor is arranged in a normal plane to the axis of the energy beam.

The spatially resolving sensor is advisably an optical sensor which is so arranged in relation to a light source for illuminating the target jet that a characteristic intensity pattern of the target jet is imaged on its receiver plane.

A photodiode with a wedge-shaped (triangular) receiver surface is preferably used as optical sensor, wherein a linear change in the photovoltage representing the output signal is associated with a change in the position of the target beam in said dimension.

However, the sensor can also be a receiver array (e.g., a CCD, a photodiode array, etc.), wherein a position of the imaged characteristic intensity pattern that is changed with respect to a zero position or neutral position is associated with a change in position of the target jet, and the difference between the changed position and the neutral position represents the output signal, preferably as a centroid difference.

In a third variant, the spatially resolving sensor has two receiver surfaces, wherein a changed differential photovoltage representing the output signal can be detected when there is a change in position of the target jet.

In a particularly advantageous manner, the optical sensor has two receiver surfaces which are tapered in a wedge-shaped manner relative to one another, wherein a greater spatial dependency of the changed photovoltage differential representing the output signal can be detected when the position of the target beam changes. This two-cell photodiode arrangement works without a dead zone when the wedge-shaped (triangular) receiver surfaces are supplemented by a diagonally oriented intermediate web to form a parallelogram, preferably a rectangle.

Two iteration steps which can be repeated cyclically are advisably provided for calibrating the differential photovoltages relative to the respective target positions. In a first step, the position of the target jet is measured in a normal position relative to the energy beam as a first differential photovoltage $U_1$ and, after a relative displacement $\Delta x$ which is carried out in a defined manner by an actuating element, a second differential photovoltage $U_2$ is detected, wherein a linear function for generating an output signal of the measuring device which is scaled with respect to the path has the following slope: $a=\Delta x/(U_1-U_2)$.

Measuring devices for detecting the directional deviation of an energy beam formed as a laser beam are advantageously provided in two dimensions orthogonal to one another, a spatially resolving sensor being arranged with its position-sensitive surface in a normal plane relative to the axis of the laser beam. The spatially resolving sensor is preferably a quadrant detector.

Actuating elements for tracking the energy beam are advisably provided in order to compensate for changes in position between the target jet and the energy beam; the output signals of the measuring devices are provided as regulating signals for the deviation of the energy beam. An actuating element in the form of a swivelable mirror is arranged in a particularly advantageous manner for the angular deflection of a laser beam used as energy beam, the mirror being swivelable at least around an axis parallel to the beam direction of the target jet.

An electromagnetic deflecting unit is provided as an actuating element for angular deflection of an electron beam used as energy beam, the deflecting unit having at least one deflecting plane orthogonal to the radiating direction of the target jet.

In another variant, actuating elements for tracking the target jet are provided in order to compensate for changes in position between the target jet and energy beam; the output signals of the measuring devices are provided as regulating signals for manipulating the exit nozzle of the target jet. The exit nozzle is advisably movable in one dimension within a normal plane of the target jet; the movement is oriented orthogonal to a plane defined by the target beam and energy beam.

In another construction, the micromanipulation of the exit nozzle is so conceived that the exit nozzle is swivelling orthogonal to the flow direction of the target jet around an axis parallel to the radiating direction of the energy beam.

Further, the measuring devices for detecting the position of the target beam can also be advantageously provided in two dimensions orthogonal to one another, wherein one spatially resolving sensor is arranged parallel to the axis of the energy beam and another spatially resolving sensor is arranged orthogonal thereto. In an arrangement of this type, the actuating elements for tracking the target beam are provided in two dimensions in order to compensate for changes in position between the target jet and energy beam; the output signals of the orthogonal spatially resolving sensors are provided as regulating signals for a two-dimensional displacement of an exit nozzle of the target jet. The exit nozzle is advisably movable in two dimensions within a normal plane of the target beam by means of a piezo-controlled micromanipulator.

In a particularly demanding construction, the actuating elements of the target beam and energy beam are provided in combination with the measuring elements and regulating elements to execute a deliberate movement of the plasma along a defined path; corresponding to the output signals of the measuring elements, each regulating element provides a time curve to be adjusted for the interaction point as a modified actuating variable for the actuating elements.

In another variant for the recording of measurement values, the measuring devices for detecting the position of the target beam in two dimensions orthogonal to the radiating direction of the target beam are designed in such a way that components of the deviation of the target beam orthogonal to the axis of the energy beam and parallel thereto can be measured by means of a spatially resolving sensor. The spatially resolving sensor advisably differs by a suitable angle relative to the parallel or orthogonal direction of the energy beam, preferably by 45 degrees, wherein the projection on the coordinate directions to be regulated can be determined as an output signal.

With the solution according to the invention, it is possible to realize the generation of short-wavelength radiation, particularly EUV radiation, which is stable over time from a plasma generated by energy input into a target flow, in which fluctuations in radiation output due to altered coupling of the excitation radiation into the target flow are minimized in that the interaction point of the energy beam and a relatively thin target beam is permanently monitored and readjusted.

The invention will be described more fully in the following with reference to embodiment examples.

BRIEF DESCRIPTION OF THE DRAWINGS

In the drawings:

FIG. 5a shows an advantageous construction for the measurement of the position of a characteristic intensity profile of the target jet by means of a position-sensitive photodiode;

FIG. 5b shows a circuit of the position-sensitive photodiode for obtaining a spatially-dependent regulating signal;

FIG. 6a shows another constructional form for measuring the position of the characteristic intensity profile of the target jet with a pair of photodiodes in a mirror-symmetric arrangement;

FIG. 6b shows a special construction for measuring the position of the characteristic intensity profile of the target jet with a two-cell photodiode array in which the summed diode width of the two photodiodes is the same for every length position of the intensity profile of the target jet;

FIG. 6c shows a circuit of the photodiodes for the measurement of differential voltage, wherein the characteristic intensity profile is in the center of the photodiode arrangement when the differential voltage is equal to zero;

DESCRIPTION OF THE PREFERRED EMBODIMENTS

Figure 1:
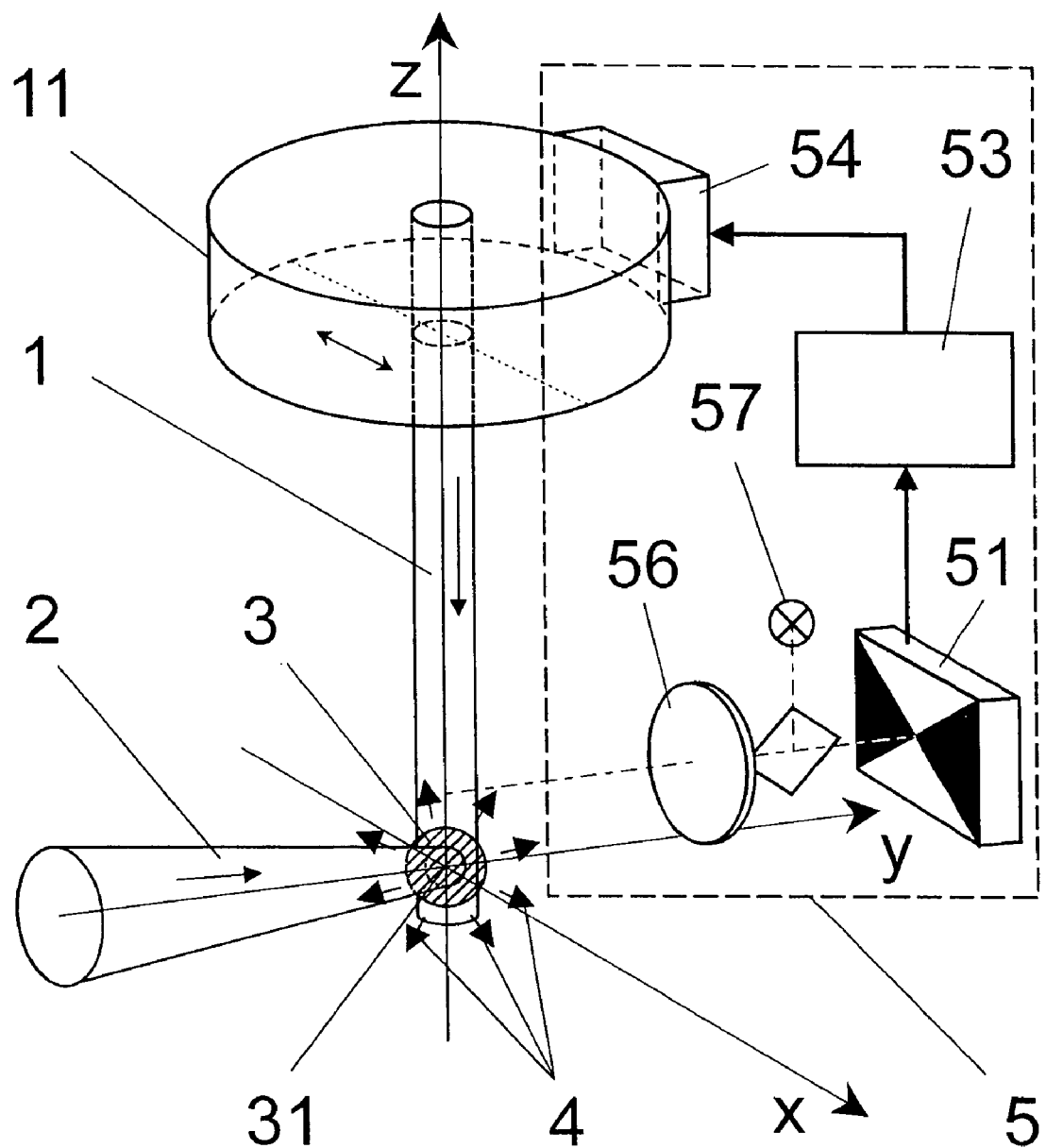
FIG. 1 shows basic view of the arrangement according to the invention comprising a laser beam directed onto a target jet, a plasma with EUV radiation emission being formed in the overlapping region of the target beam and laser beam.

The basic construction of the arrangement according to the invention, as is shown in FIG. 1, comprises a target jet 1 which is provided by a target generator, of which only the exit nozzle 11 is shown, an energy beam 2 which—without limiting generality—generates a plasma 3 in a vacuum chamber (not shown) preferably orthogonally through interaction (energy input) with the target jet 1. The plasma 3 emits short-wavelength radiation 4 preferably in the extreme ultraviolet (EUV) spectral region. The interaction point 31 which in practice describes the intersecting surface of the energy beam 2 and respective target jet 1 is not a fixed point due to vibrations and other interfering influences during the generation of target jet 1 and energy beam 2; rather, it is subject to continuous changes in position resulting in a displacement of the center of gravity of the plasma 3 and changes in the effective cross section of the target beam and energy beam and, therefore, displaces the source location of the emitted radiation 4 in an undesirable manner or changes the radiation dose. However, particularly changes in the pulse energy of the radiation 4 with respect to the pulse-to-pulse stability can be tolerated only within very narrow limits for applications in semiconductor lithography for the exposure of very small structures.

Therefore, the arrangement according to the invention has a measuring and regulating device 5 for detecting and correcting the position of the plasma 3 which monitors the correspondence between the axes of the target jet 1 and energy beam 2 at the interaction point 31.

When a Cartesian coordinate system is arranged in such a way with respect to the flow direction of the target jet 1 and the radiating direction of energy beam 2 that the target jet 1 extends vertically in negative direction of the Z axis and the energy beam 2 extends horizontally in positive direction of the Y axis, at least one spatially resolving surface of the sensor 51 is arranged in the Y-Z plane in order to record an image of the dimension of the target jet 1 in X direction by means of imaging optics 56. The processing unit 53 (as regulating element) generates a regulating variable from the output signal of the sensor 51 for a target actuating element 54 for correcting a deviation of the target jet 1 by means of changing the position of the exit nozzle 11.

Figure 2:
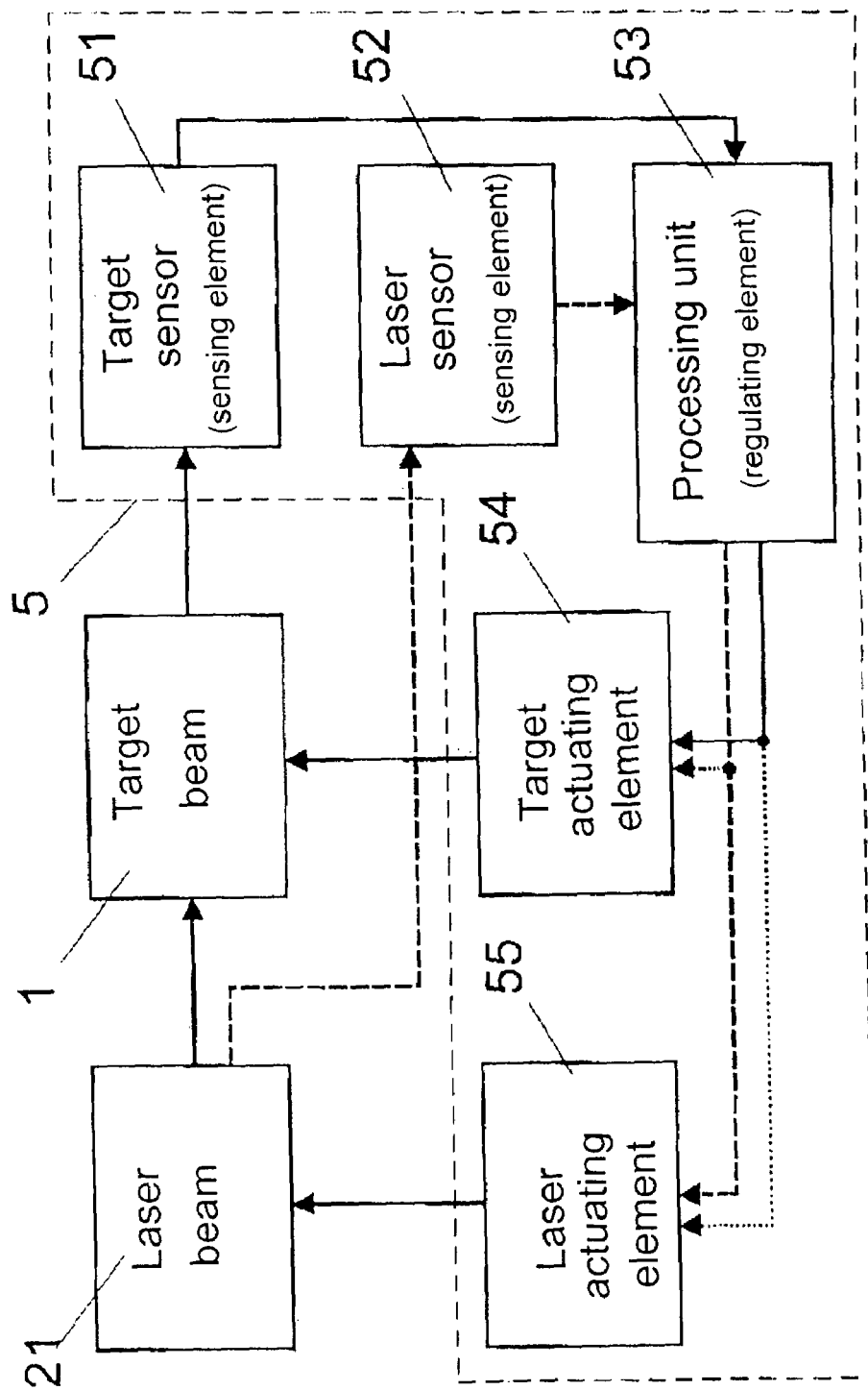
FIG. 2 is a schematic view of the control loop with sensor elements for detecting the positions of the target jet and laser beam and corrective regulation for the target beam and laser beam transmits the respective actuating value.

The measuring and regulating device 5 can comprise separate sensing elements, regulating elements and actuating elements for target jet 1 and energy beam 2. A block diagram of the construction of a complex measuring and regulating device 5 of this kind is shown in FIG. 2.

In the following, without limiting generality, a laser beam 21, as energy beam 2, introduces the energy for plasma generation into the target jet 1. In this example, the measuring and regulating device 5 has two different control loops which can be operated alternately or in conjunction as is shown schematically by the solid and dashed lines. The starting point of a control loop is a spatially resolving sensor which either detects the position of the target jet 1 as a target sensor 51 or detects the position of the laser beam 21 as a laser sensor 52. The downstream processing unit 53 which is shared by both sensors 51 and 52 in this case receives the respective output signal of the sensing elements, target sensor 51 and/or laser sensor 52, and calculates therefrom a control signal for at least one of the following actuating elements: target actuating element 54 and/or laser actuating element 55.

Referring to FIG. 1, the target actuating element 54 influences the exit nozzle 11 in an orthogonal plane relative to the radiating direction of the energy beam 2 (laser beam 21). Manipulation can be carried out as a linear movement or as a swivelling movement of the exit nozzle 11. The movement of the exit nozzle 11 causes a displacement of the beam axis of the target jet 1 within the normal plane relative to the radiating direction of the energy beam 2 and is carried out corresponding to the error position of the axes of the target jet 1 and energy beam 2 that was detected by the target sensor 51.

Figure 3A:
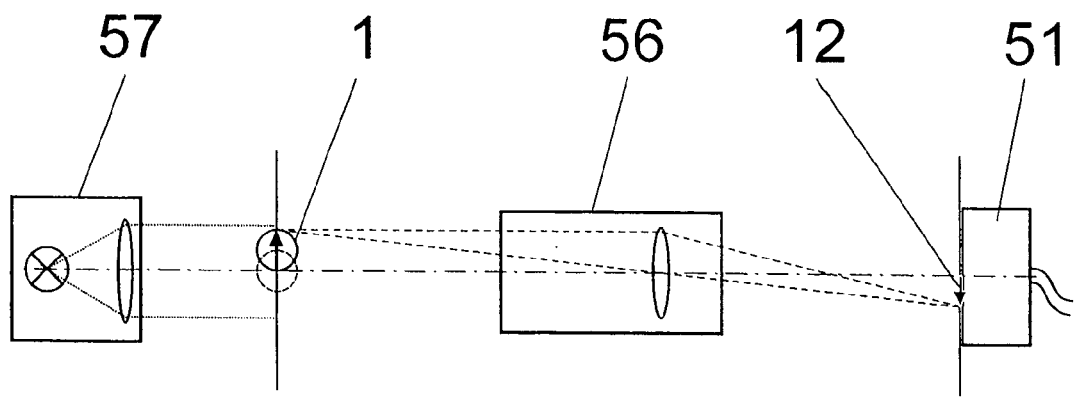
FIG. 3a shows a constructional variant for the sensing element for measuring the position of the target jet with transmitted illumination.

The detection of the error position of the target jet 1 is carried out according to the principle illustrated schematically in FIG. 3a, for example, just above the beam axis of the energy beam 2. A light source 57 illuminates the target jet 1 with a preferably parallel bundle. A spatially resolving sensor 51 which receives a characteristic intensity pattern 12 as an image of the target beam 1 by means of imaging optics 56 is arranged opposite to the light source 57. Corresponding to the spatial displacement of the image relative to a neutral position N of the target jet 1, the sensor 51 generates an output signal which is changed in a defined manner and which is fed to the processing unit 53 (shown only in FIGS. 1 and 2) for generating a regulating variable.

Figure 4:
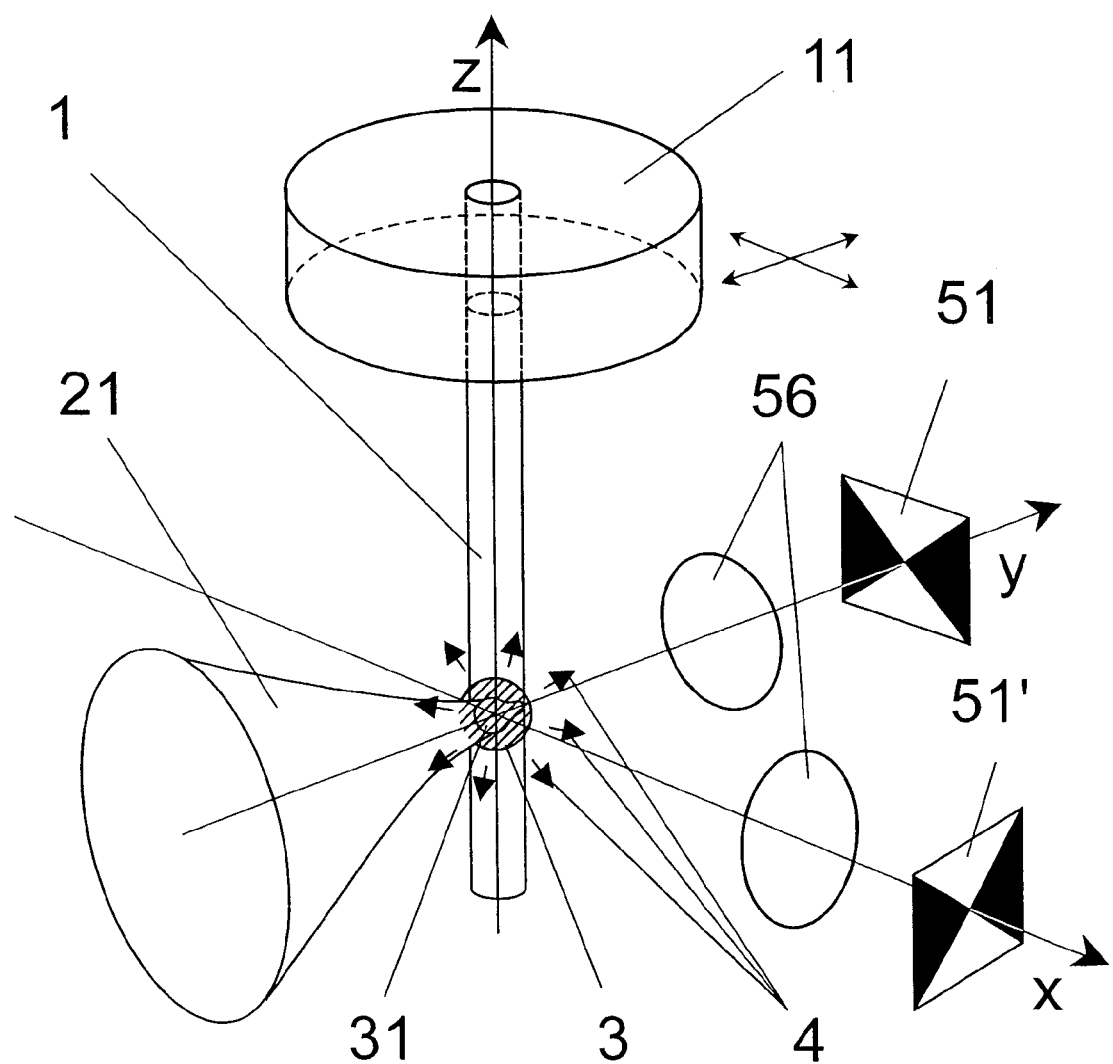
FIG. 4 shows another construction of the invention with two-dimensional detection of the position of the target jet.

When the energy beam 2 is a focused laser beam 21, as is shown schematically in FIG. 4, detection of the target jet 1 in the axis of the laser beam 21 in the Y-direction is made possible in that the light from the light source 57 (shown only in FIGS. 1 and 3a) is coupled collinearly with the laser beam 21 which is provided as energy beam 2. This arrangement has the advantage that the deviation of the target jet 1 is measured directly and precisely at the interaction point 31. In all other cases in which the position of the target jet 1 is detected outside the beam axis of the laser beam 21 and when using non-optical energy beams 2, measurement is always carried out only in the vicinity of the laser beam 21 with the optically non-contacting sensor system in FIG. 3a, or only one component of the deviation is measurable.

Figure 3B:
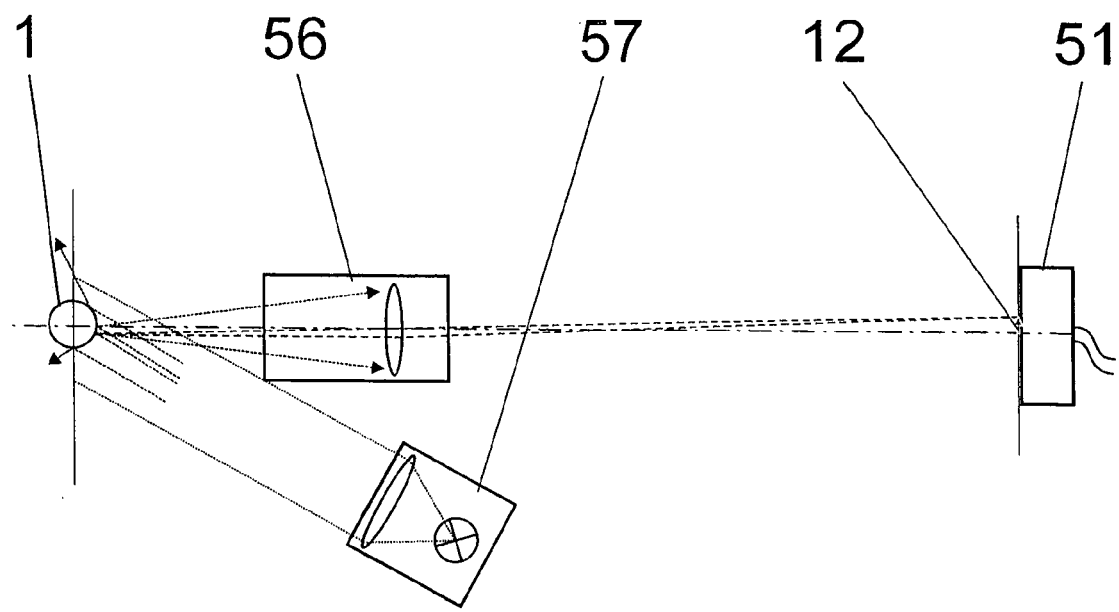
FIG. 3b shows a constructional variant for the sensing element for measuring the position of the target jet with incident illumination.

It should be expressly mentioned that the optical system of FIG. 3a can be operated in an analogous manner with incident illumination of the target beam 1, i.e., with reflected illumination light; the light of the light source 57 can be coupled by the imaging optics 56 (shown schematically in FIG. 1) or, according to FIG. 3b, is directed to the target jet 1 as a parallel bundle at a determined oblique angle of incidence with respect to the imaging optics 56.

In the example according to FIG. 3b, the light source 57 sends its light to the target jet 1 which is virtually circular in cross section and which—due to the surface curvature—reflects the incident light back at many slightly different reflection angles, wherein a sufficiently intensive component of the bundle reaches the imaging optics 56 and is transmitted to the spatially resolving sensor 51. The characteristic intensity pattern 12, as image of the target jet 1, is received in a weaker manner compared to the variant in FIG. 3a; however, a definite spatial correlation results for occurring position deviations of the target jet 1.

For uniform emission of the EUV radiation 4, the target jet 1 must always be reliably struck by the laser beam 21, i.e., the intersection surface of the two beams should be constant. As can already be seen from FIG. 1, it is sufficient in principle to regulate the position of either the target jet or the energy beam in order to maintain the relative position of both beams constant. Moreover, for purposes of simplification, the position or direction of the laser beam 21 can be recorded in a sufficiently stable manner over time so that it is only necessary to measure the position of the target jet 1 perpendicular to the laser beam 21 in X-direction. In this way, the intersection surface of the target jet and the energy beam and, therefore, the radiation dose over time are maintained sufficiently constant.

When the radiation 4 of a plasma 3 is coupled out orthogonally, the dimension and position of the plasma 3 along the beam axis of the laser beam 21 (Y axis) are also important for the stability of the source location of the radiation 4. In this case, the measuring and regulating device 5 must detect changes in the position of the target jet 1 in two orthogonal directions and the target actuating element 54 must enable two-dimensional movement of the exit nozzle 11. For this purpose, according to FIG. 4, two spatially resolving sensors 51 are arranged orthogonal to one another. These two spatially resolving sensors 51 are understood as target sensors 51 and 51' and furnish deviations of the target jet 1 in pure components of X and Y in the coordinate system selected above.

The preferred variant for detection of the position of the target jet 1 in separate components of the X- and Y-dimensions of the target jet 1 is shown schematically in FIG. 4. The detection of the position of the target jet 1 can be carried out in a particularly simple and advantageous manner with imaging optics 56, e.g., in the form of a microscope objective or 1:1 imaging optics, and a spatially resolving sensor 51, e.g., with suitably constructed photodiode 511 (FIGS. 5a, 6a and 6b) or a receiver array 517 (FIG. 7). The imaging of the illuminated target jet 1 generates a characteristic intensity profile 12 in the sensor plane.

Depending upon the position of the light source 57 relative to the position of the sensor 51, the intensity profile 12 is to be seen as a reduction in intensity when the target jet 1 is arranged between the light source 57 and sensor 51 and accordingly produces a shadow (FIG. 3a) or is formed as an increase in intensity when light reaches the sensor 51 because of the scattering or reflecting characteristics of the surface as image of the target jet 1 (FIG. 3b). The measurement of the intensity profile 12 in the sensor plane is used to determine the position of the target jet 1 (actual value measurement).

As is shown in FIG. 5a, the position of the intensity profile 12 can be determined in a particularly simple manner by means of a photodiode 511 whose active surface 512 has a different height parallel to the image plane of the imaging optic 56 and perpendicular to the direction of the target jet 1 (X-direction), so that a different proportion of the active surface 512 of the photodiode 511 is swept over depending upon the position of the intensity profile 12. Therefore, depending upon the X-position of the target jet 1, a correspondingly different photocurrent flows over a resistor 513 connected in parallel. In the simplest case, the active surface 512 of the photodiode 511 is formed as a triangle or wedge. The flowing photocurrent then behaves proportionally in relation to the X-position of the intensity profile 12. The associated connection of the photodiode 511 is shown in FIG. 5b, wherein the photovoltage 514 dropping at the parallel-connected resistor 513 serves as an output signal of the sensor 51 and accordingly as an input variable (actual value) of the processing unit 53 (see FIG. 2) for regulating the stability of the plasma 3.

Another construction of the spatially resolving sensor 51 is shown in FIG. 6a. In this case, the sensor comprises two photodiodes 511 whose active surfaces 512 are uniformly illuminated by the (symmetric) intensity pattern 12 of the target jet 1 in its neutral position N. If the intensity pattern 12 moves toward the left or right (when the target jet 1 moves in direction of the X-axis), the areas $A_1$ and $A_2$ which are of equal size in the neutral position N change and consequently generate different photocurrents corresponding to their size. A differential photovoltage 515 representing the output signal of the sensor 51 can be obtained therefrom, according to FIG. 6c, as an output signal. The position sensitivity of the two-cell sensor is appreciably increased by active receiver surfaces 512 which are oriented relative to one another in a wedge-shaped manner as is shown in FIG. 6a in the shape of isosceles triangles, since the illuminated area $A_1$ decreases proportionally when the intensity pattern 12 moves, e.g., to the right, out of the neutral position N, while the area $A_2$ of the other photodiode 511 increases (in the same measure as the reduction in $A_1$).

A particularly sensitively designed spatially resolving sensor 51 is shown in FIG. 6b. This two-cell photodiode array contains two congruent triangular active receiver surfaces 512 which can be moved one inside the other by rotating 180° around a center of rotation located at the center of the hypotenuse. Together, the two separate receiver areas 512 form a rectangle with a light-insensitive web 516 therebetween which, in contrast to the variant in FIG. 6a, has no effect on the shape of the output signal when the intensity pattern moves. In the symmetrically situated neutral position N, the intensity pattern 12 illuminates a constant total area of area proportions $A_1$ and $A_2$ which are located vertically one above the other and which sensitively change the differential photovoltage 515 linearly and without zero crossover proportional to the movement of the intensity pattern 12 over a greater (compared to FIG. 6a) path. The signal differences between neutral position N (area portions $A_1$ and $A_2$) and a displaced (indicated by dashes) position of the intensity pattern 12 can easily be calculated through the changed ratios of the areas $A_3$ and $A_4$.

Figure 7A:
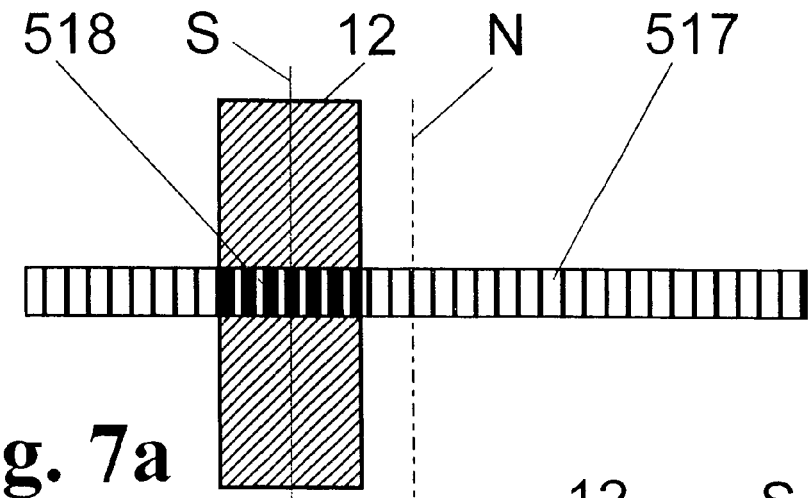
FIG. 7a shows another sensor arrangement for measuring the position of the characteristic intensity profile of the target jet with a CCD array.
Figure 7B:
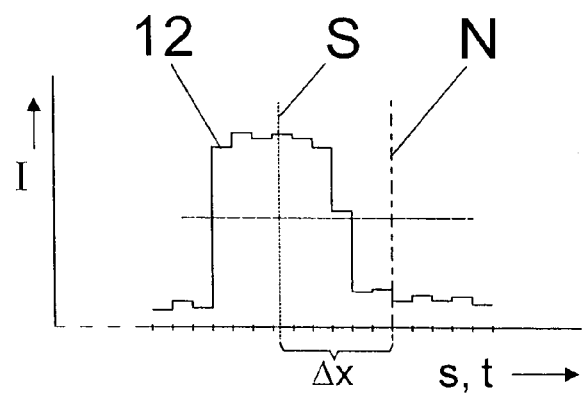
FIG. 7b is a schematic illustration for obtaining the output signal from the signal shape of a read-out CCD array.

Another variant of the construction of the spatially resolving sensor 51 uses a receiver array 517 in the form of a CCD or a photodiode array as is shown in FIG. 7a. With respect to the receiver array 517, a centroid position S of the intensity pattern 12 must be determined in the processing unit 53 from a quantity of exposed sensor elements 518 in order to use the distance to the selected neutral position N of the intensity pattern for influencing the target actuating element 54. The basic structure of the intensity pattern 12 and the derivation of the regulating variable as absolute displacement $\Delta x$ are shown in FIG. 7b.

The measuring direction of the sensor 51 that is provided for the target jet 1 and defined by the optical axis of the imaging optics 56 can deviate from the radiating direction of the laser beam 21 within certain limits. The position of the target jet 1 then results from the projection on the axis perpendicular to the laser beam 21 for the X-component.

In this case, however, as an alternative to FIG. 4, it is also possible to position only one individual sensor for both components (not shown) on a location intermediate between the X-axis and Y-axis, preferably in a 45-degree position. By shifting the position of the individual sensor 51 to a smaller angular distance with one of the axes, X or Y, the resolution of a component, for example, the X-component, can be increased in a meaningful manner for more accurate detection of deviations of the target jet 1 from the laser beam direction at the expense of the other components.

Figure 8:
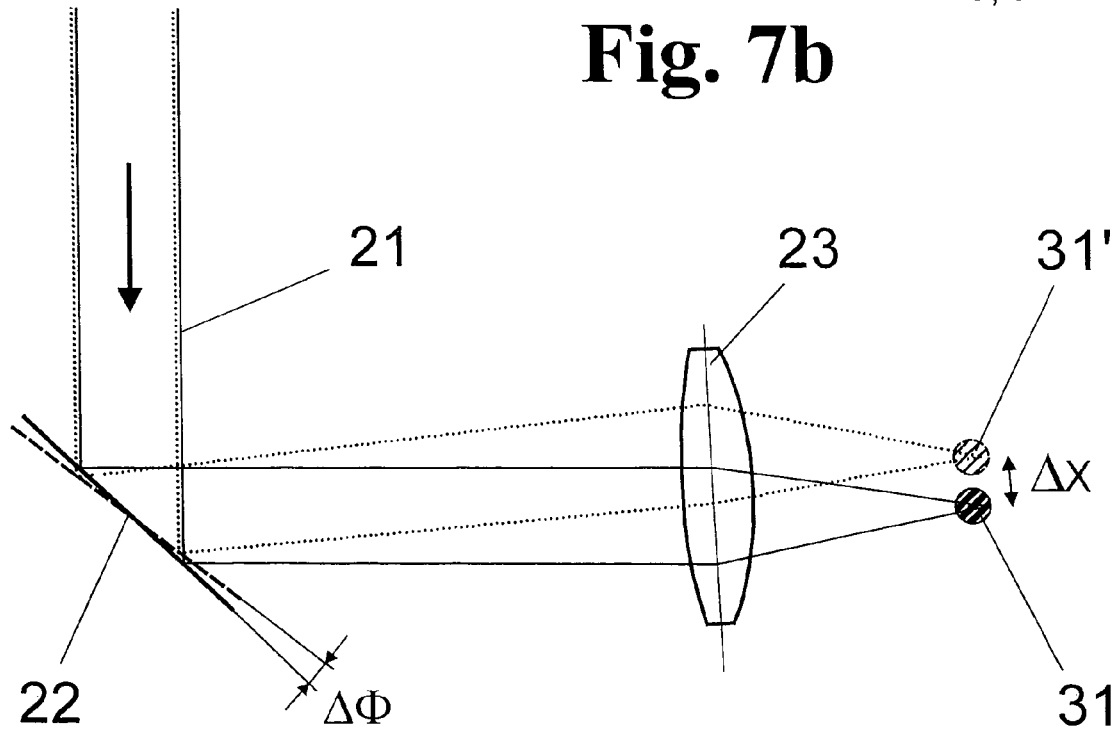
FIG. 8 shows a preferred construction of an actuating element for the laser beam which is a mirror whose angle is adjustable and which converts a tilting of the mirror into a position displacement of the focus.

If the position of the plasma 3 varies within certain limits, the position of the laser beam 21 can be readjusted instead of regulating the position of the target jet 1 as described above. According to FIG. 8, the actuating element 55 (only designated in FIG. 2) for the laser beam 21 can be constructed as a mirror 22 whose angle is adjustable. During a rotating movement of the mirror 22 by an angle of $\Delta\Phi$, the laser focus which is directed to the target jet 1 through a lens 23 is changed into a position displacement $\Delta x=2f\cdot\Delta\Phi$. The rotational angle $\Delta\Phi$ is then proportional to the position of the target beam 1 and accordingly to the measurement quantity, that is, to the photovoltage 514 (or the strictly monotonic differential photovoltage 515 according to FIG. 6b) as an output quantity of the sensor 51. In case of a piezoelectric adjustment of the mirror rotation, the processing unit 53 is a simple regulating element with the function of a proportional voltage amplifier.

In case the direction or position of the laser jet 1 is subject to certain fluctuations exceeding the required tolerance range, the position of the laser beam 21 can be measured additionally by another sensing element, laser sensor 52, and processed in the processing unit 53 for position regulation. Independent regulating means for the laser beam 21 and target jet 1 can be used as regulating mechanisms, but also regulating devices which process the signals of a plurality of sensing elements 51 and 52 and control only one actuating element, e.g., the target actuating element 54.

In addition to the spatial stabilization of the plasma 3 in three spatial directions, the X-direction and Y-direction through target jet stabilization (according to FIG. 4) and the Z-direction through laser beam stabilization (e.g., according to FIG. 8), a specific movement of the plasma 3 along a defined path in space can also be realized within certain limits by the system described above. For this purpose, the laser beam 21 is moved with its focus in the X-Y plane in a defined manner—analogous to FIG. 8—by means of two independent rotating mirrors or by means of one mirror 22 which is rotatable in two axes. The movement in X-direction guides the target jet 1 by means of the target actuating element 54 in a corresponding manner by means of synchronized regulation through the processing unit 53. The plasma 3 can accordingly be moved along a preselected path in the X-Z plane.

The plasma 3 can be moved additionally in the Y-direction through a displacement of the beam axis of the target jet 1 by means of a defined movement of the exit nozzle 11 in Y-direction. This makes possible a deliberate movement of the plasma 3 in all three spatial directions with continuous monitoring and regulation of the source location.

While the foregoing description and drawings represent the present invention, it will be obvious to those skilled in the art that various changes may be made therein without departing from the true spirit and scope of the present invention.

| | Reference Numbers |
|---|---|
| 1 | target jet |
| 11 | exit nozzle |
| 12 | intensity profile |
| 2 | energy beam |
| 21 | laser beam |
| 22 | mirror |
| 23 | lens |
| 3 | plasma |
| 31 | interaction point |
| 4 | radiation |
| 5 | measuring and regulating device |
| 51 | sensor/target sensor (sensing element) |
| 511 | photodiode |
| 512 | active area |
| 513 | resistor |
| 514 | photovoltage |
| 515 | differential photovoltage |
| 516 | web |
| 517 | receiver array |
| 518 | exposed sensor element |
| 52 | laser sensor (sensing element) |
| 53 | processing unit (regulating element) |
| 54 | target actuating element |
| 55 | laser actuating element |
| 56 | imaging optics |
| 57 | light source |
| X, Y, Z | coordinate (axes) |
| N | neutral position |
| S | centroid (of the intensity pattern 12) |
| $\Delta x$ | displacement |

What is claimed is:

1. An arrangement for the stabilization of the radiation emission of a plasma, comprising:
    a bundled energy beam which is directed to a target which is formed as a target jet and which has a flow direction oriented substantially orthogonal to the radiating direction of the energy beam;
    measuring devices being provided for successive detection over time of deviations of at least one of the directions of the target jet or the energy beam from an intersection point of the two directions that is provided as an interaction point;
    said measuring devices having output signals which are applied as regulating variables for compensation of the deviations of the directions of the target jet and the energy beam on the interaction point; and
    actuating elements being provided for adjusting and tracking at least one of the directions of the target jet and energy beam depending on the output signal of the measuring devices in the manner of a control loop.

2. The arrangement according to claim 1, wherein said measuring devices are provided for detecting deviations of the jet and beam directions at the interaction point in a defined dimension which is oriented orthogonal to the directions of the target jet and the energy beam, the measuring devices being arranged substantially in the direction of the axis of the energy beam.

3. The arrangement according to claim 2, wherein said measuring devices comprising one measuring device in said defined dimension for acquiring the position of the target jet, wherein a spatially resolving sensor is arranged in a normal plane to the axis of the energy beam.

4. The arrangement according to claim 3, wherein the spatially resolving sensor is an optical sensor which is so arranged in relation to a light source for illuminating the target jet that a characteristic intensity pattern of the target jet is imaged on its receiver plane.

5. The arrangement according to claim 4, wherein the sensor is a photodiode with a wedge-shaped receiver area, wherein a linear change in the photovoltage representing the output signal is associated with a change in the position of the target jet in said dimension.

6. The arrangement according to claim 4, wherein the sensor is a receiver array, wherein a position of the imaged characteristic intensity pattern that is changed with respect to a neutral position is associated with a change in position of the target jet, and the difference between the changed position and the neutral position represents the output signal, preferably as a centroid difference.

7. The arrangement according to claim 4, wherein the sensor has two receiver areas, wherein a changed differential photovoltage representing the output signal can be detected when there is a change in position of the target jet.

8. The arrangement according to claim 7, wherein the sensor has two receiver areas which are tapered in a wedge-shaped manner relative to one another, wherein a changed differential photovoltage representing the output signal can be detected when the position of the target jet changes.

9. A device according to claim 8, wherein two iteration steps which can be repeated cyclically are provided for calibrating the differential photovoltages relative to the respective target positions.

10. A device according to claim 7, wherein two iteration steps which can be repeated cyclically are provided for calibrating the differential photovoltages relative to the respective target positions.

11. The device according to claim 10, wherein the position of the target jet can be measured in a normal position relative to the energy beam as a first differential photovoltage $U_1$ in a first step and, after a relative displacement $\Delta x$ which is carried out in a defined manner by an actuating element, a second differential photovoltage $U_2$ can be detected, wherein a linear function for generating an output signal of the measuring device which is scaled with respect to the path has the following slope: $a=\Delta x/(U_1-U_2)$.

12. The arrangement according to claim 2, wherein said actuating elements for tracking the target jet are provided in order to compensate for changes in position between the target jet and energy beam, wherein the output signals of the measuring devices are provided as regulating signals for manipulating the position of an exit nozzle of the target jet.

13. The arrangement according to claim 12, wherein the exit nozzle is movable in one dimension within a normal plane of the target jet, this movement being oriented orthogonal to a plane defined by the target jet and energy beam.

14. The arrangement according to claim 12, wherein the exit nozzle is swivelling orthogonal to the flow direction of the target jet around an axis parallel to the radiating direction of the energy beam.

15. A device according to claim 1, wherein said measuring devices for detecting the directional deviation of a laser beam as energy beam are provided in two dimensions orthogonal to one another, a spatially resolving sensor being arranged in a normal plane relative to the axis of the laser beam.

16. The device according to claim 15, wherein the spatially resolving sensor is a quadrant detector.

17. The arrangement according to claim 1, wherein actuating elements for tracking the energy beam are provided in order to compensate for changes in position between the target jet and the energy beam, wherein the output signals of the measuring devices are provided as regulating signals for the deflection of the energy beam.

18. The arrangement according to claim 17, wherein a swivelling mirror is arranged in one dimension as an actuating element for the angular deflection of a laser beam used as energy beam, the mirror being swivelling at least around an axis parallel to the flow direction of the target jet.

19. The arrangement according to claim 18, wherein a swivelling mirror is arranged in one dimension as an actuating element for the angular deflection of a laser beam used as energy beam, the mirror being swivelling in addition around an axis orthogonal to the flow direction of the target jet so that the plasma and, therefore, the source location of the radiation can be changed.

20. The arrangement according to claim 17, wherein an electromagnetic deflecting unit is provided as an actuating element for angular deflection of an electron beam used as energy beam, the deflecting unit having at least one deflecting plane orthogonal to the flow direction of the target jet.

21. The arrangement according to claim 1, wherein said measuring devices for detecting the position of the target jet are provided in two dimensions orthogonal to one another, wherein one spatially resolving sensor is arranged parallel to the axis of the energy beam and another sensor is arranged orthogonal thereto.

22. The arrangement according to claim 21, wherein said actuating elements for tracking the target jet are provided in two dimensions in order to compensate for changes in position between the target jet and energy beam, wherein the output signals of the orthogonal spatially resolving sensors are provided as regulating signals for a two-dimensional displacement of an exit nozzle of the target jet.

23. The arrangement according to claim 22, wherein the exit nozzle is movable in two dimensions within a normal plane of the target jet by a micromanipulator.

24. A device according to claim 22, wherein said actuating elements of the target jet and energy beam are provided in combination with the measuring elements and regulating elements to execute a deliberate movement of the plasma along a defined path, wherein, corresponding to the output signals of the measuring elements, the regulating elements provide a time curve to be adjusted for the interaction point as a modified actuating variable for said actuating elements.

25. The arrangement according to claim 1, wherein said measuring devices for detecting the position of the target jet in two dimensions orthogonal to the flow direction of the target jet are arranged in such a way that components of the deviation of the target jet orthogonal to the axis of the energy beam and parallel thereto can be measured by means of a spatially resolving sensor.

26. A device according to claim 25, wherein the spatially resolving sensor is arranged at an angle which differs from the parallel or orthogonal direction of the energy beam by a suitably selected angle wherein the projections on the coordinate directions to be regulated can be determined as output signals.

27. The device according to claim 26, wherein said selected angle is 45°.

* * * * *